Patented Nov. 16, 1943

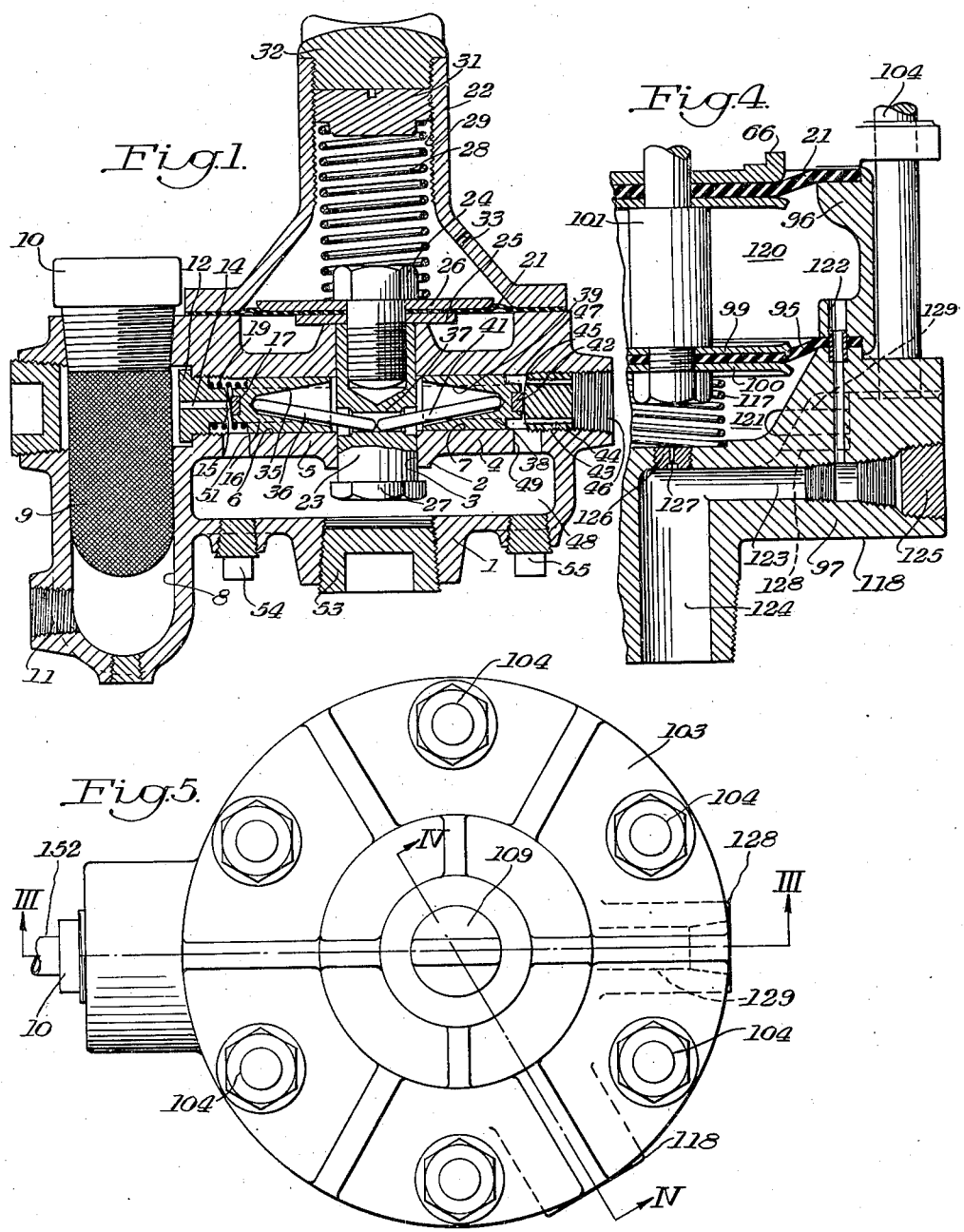

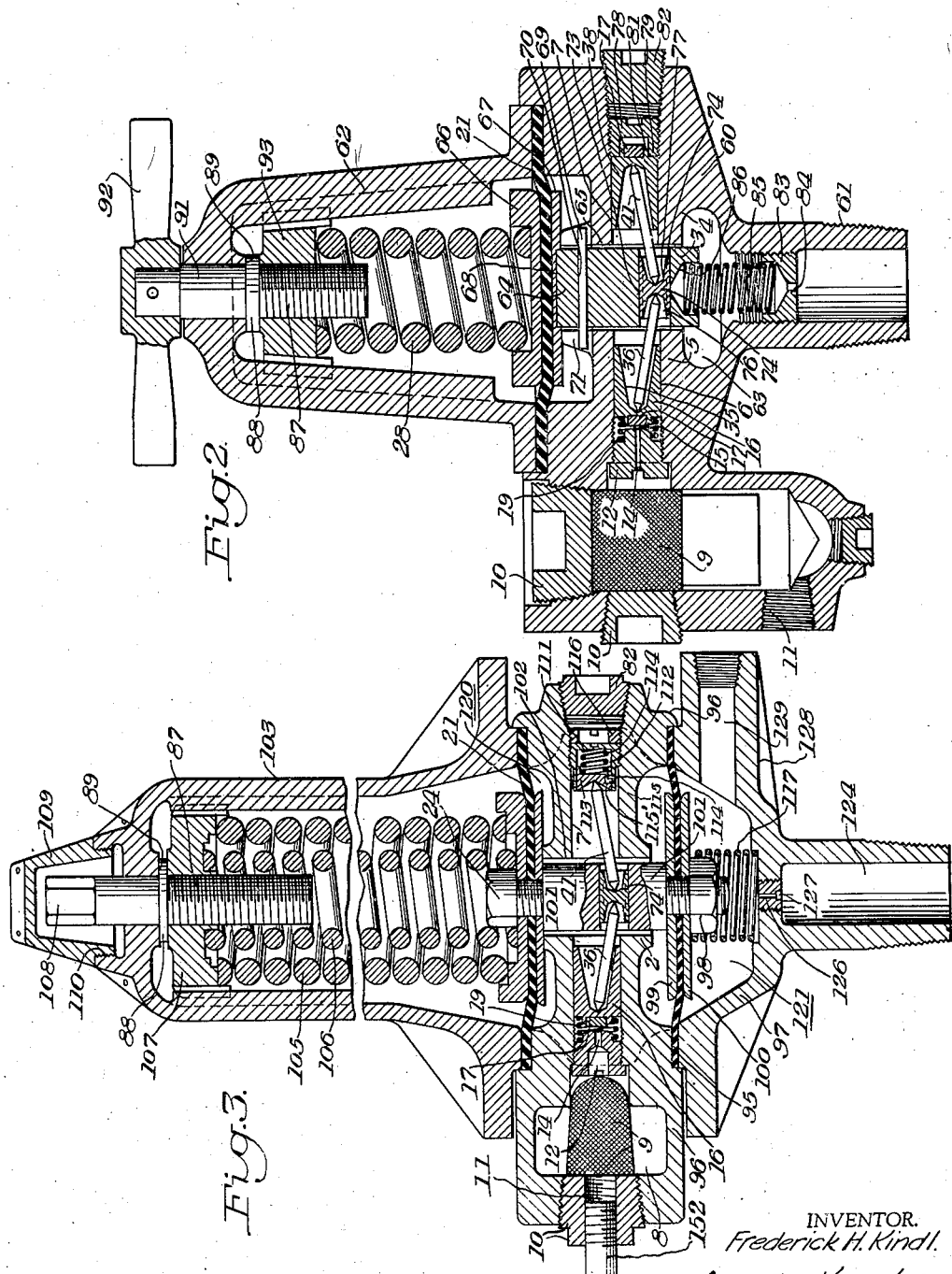

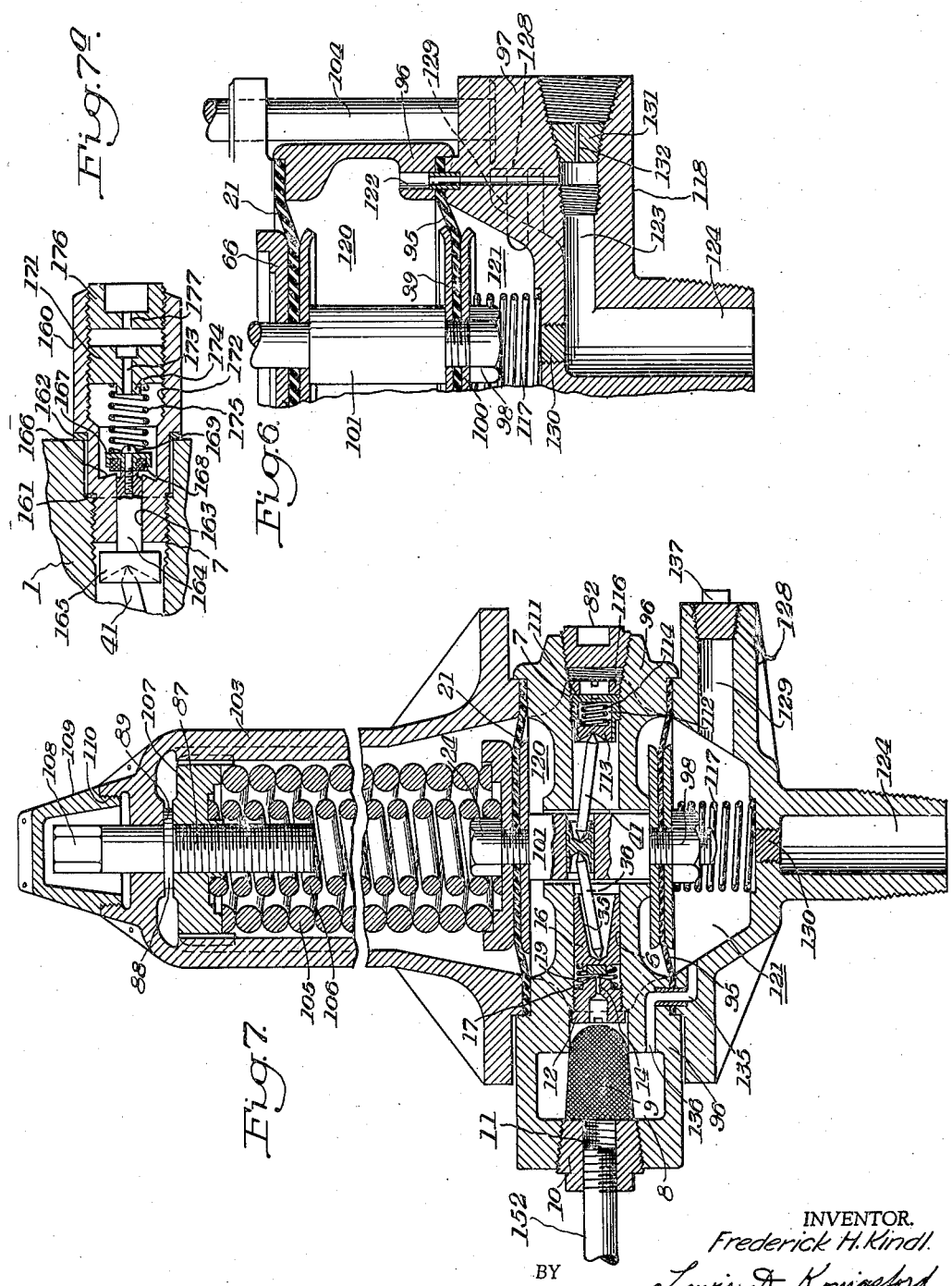

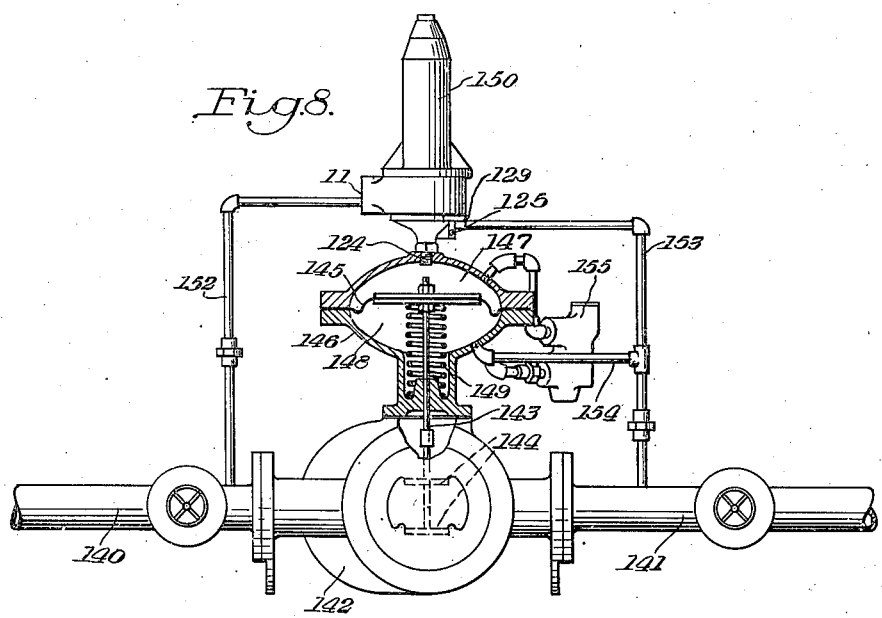
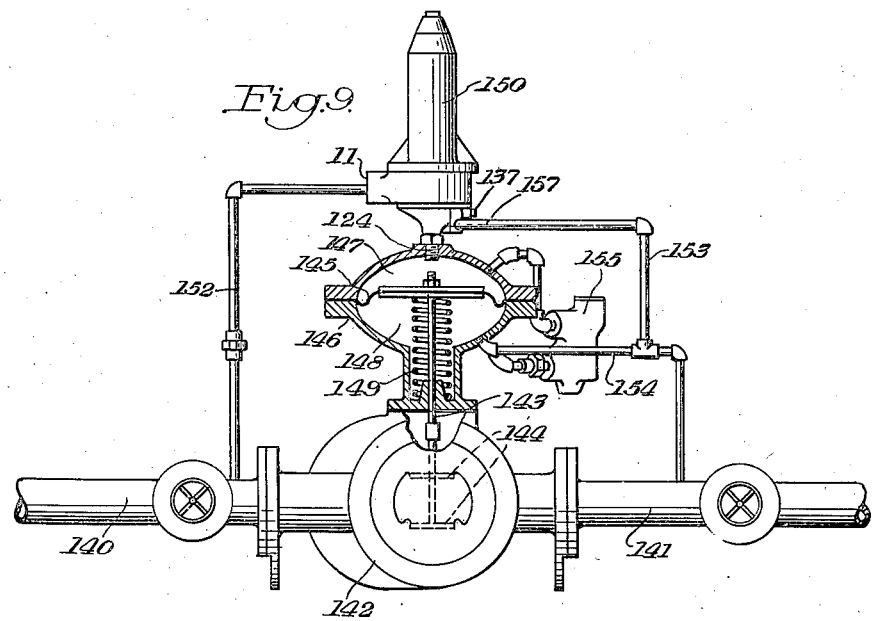

2,334,496

UNITED STATES PATENT OFFICE 2,334,496

FLUID PRESSURE REGULATOR

Frederick H. Kindl, Pittsburgh, Pa., assignor to Pittsburgh Equitable Meter Company, Pittsburgh, Pa., a corporation of Pennsylvania Application September 6, 1939, Serial No. 293,587

9 Claims. (Cl. 50—26)

The present invention relates to improvements in fluid pressure regulators, and relates particularly to improvements in fluid pressure regulators designed to act as pilot valves to control the operation of a main regulator or valve, and to the systems using my improved pilot valve. This application is a continuation in part of my application for pressure control systems, Serial No. 260,049, filed March 6, 1939, which matured into Patent No. 2,273,111, on February 17, 1942, and it is intended to incorporate herewith by reference, the full disclosure of said application.

It is an object of this invention to provide a regulator which is sensitive to small changes in pressure.

Another object of the invention is the provision of a regulator in which the ratio of valve opening to pressure control may be adjusted within certain limits.

A further object of the invention is the provision of a regulator having separate loading and control chambers and which is responsive substantially solely to changes in the control pressure.

Another object is the provision of a regulator which may be readily utilized as a downstream pressure regulator or a back pressure regulator.

Still another object of the invention is the provision of a pilot loading or control system which will maintain a constant outlet pressure in the system over a wide range of flows.

A further object is the provision of a regulator system of the pilot loading or control type in which the pilot bleed may be bled to atmosphere or back into the low pressure line.

These and other objects of the invention will be apparent from a consideration of the following specification taken in connection with the accompanying drawings, wherein I have shown preferred embodiments of my invention by way of example, and wherein:

Figure 1 is a vertical section through a preferred embodiment of my pilot regulator, Figure 2 is a vertical section corresponding to Figure 1 of a modification, Figure 3 is a vertical section taken on line III—III of Figure 5 of a further modification employing a loading chamber separate from the control chamber, Figure 4 is a fragmentary vertical sectional view taken on line IV—IV of Figure 5, Figure 5 is a plan view of Figure 3, Figure 6 is a fragmentary vertical sectional view corresponding to Figure 4 of a modification, Figure 7 is a vertical sectional view of a further modification, Figure 7a is a sectional view of a further modification, Figure 8 is a view partly diagrammatic, showing a pilot loading or control system employing my improved regulator, and Figure 9 is a partly diagrammatic view showing a modified loading and control system employing my improved regulator controlled by back pressure.

Referring to Figure 1 of the drawings, there is shown a casing 1 having a central hub 2 which is bored at 3, and the casing has radial spokes 4 and 5 integral with the casing and hub. Bores 6 and 7 through the spokes communicate with the central bore 3 in the hub. A cylindrical well or recess 8 shown integral with the casing 1 is adapted to receive a suitable filter 9 secured to a threaded plug 10 in any suitable manner, and has an inlet 11 to permit the entry of fluid from any suitable high pressure source therein. Bore 6 communicates with the well 8 and has a valve orifice bushing 12 threaded therein having an orifice 14 therethrough, the bushing terminating in a receding valve face 15 around the orifice. A non-circular valve member 16, which, as shown, is in the form of a hexagonal plug, is slidably received in the bore 6 and carries a valve insert 17 at its end which is adapted to seat against the valve face 15 of the valve bushing 12. A light spring 19 is interposed between the valve member 16 and the valve bushing 12 against suitable shoulders provided thereon.

A diaphragm 21 is secured at its periphery between the spring cover 22 and the upper surface of casing 1, and a cylindrical guide member 23 extends through bore 3 with a close guiding fit and at its upper end is secured to the diaphragm 21 by a cap screw 24, the diaphragm being clamped thereby between washer 25 and diaphragm plate 26. Connecting member 23 may be machined cylindrical from hexagonal bar stock, leaving a hexagonal head 27 at one end. The spring 28 in the recess 29 in the cover bears against the diaphragm 21 and by means of a threaded adjustment plug 31 in the recess the spring may be adjusted to exert the proper loading effect on the diaphragm 21. The outlet end of spring recess 29 is closed by a cap 32 and a suitable vent 33 is provided in the cover 22.

Valve member 16 has a conical recess 35 in its end which receives one end of a rod 36 suitably rounded at its end to provide a bearing surface of reduced area and thus reduce friction, and the connecting member 23 is transversely bored at 37 to slidably receive the opposite end of rod 36. A shoe 38 is slidably disposed in the bore 7 and has a conical recess 39 in one end to receive a rod 41 having one end in the recess 39 and the other end in bore 37 in abutting relation to rod 36. The shoe 38 serves as an extra or replacement outlet valve member and for this purpose is constructed like valve member 16 with a valve insert 42 therein. A plug 43 threaded in the bore 7 has an end 45 engaging the valve seat member 42 to adjust the movement of the shoe 38, and a plurality of holes 44 provides an outlet for fluid.

An outlet chamber 48 is provided in the regulator body and a bore 49 in the wall of spoke 4 connects the outlet chamber with the outlet orifice 44 when the abutment or valve member 38 is open. A similar bore 51 in the wall of spoke 5 connects outlet chamber 48 with the inlet orifice 14 when valve 16 is open. As the spokes 4 and 5 do not fill the whole central space of the casing, it will be apparent that the chamber 48 is closed on the upper end by diaphragm 21 and pressure in chamber 48 is applied to the underside of the diaphragm. The plug 53 in the casing provides access to the central guide member 23 when this member requires replacement or repair, and plugs 55 and 54 close the holes in the casing that are made in order to drill holes 49 and 51.

The operation of the regulator now will be described. Fluid under pressure enters the inlet 11, passing through the filter 9, and when the valve 16 is open passes through the orifice 14 and through the passage 51 into the outlet chamber 48, and passes through passage 49 and orifices 44 from chamber 48, and thence by any suitable conduit connected at 46 to any desired point. The pressure in chamber 48 thus will depend generally on the difference in rates of flow into and out of chamber 48. When the pressure in the outlet chamber 48 builds up so as to counterbalance the effect of the spring 28 on the diaphragm 21, the diaphragm and central guide member 23 are moved upwardly, thus causing rods 36 and 41 to approach alignment and thus force the valve 16 against its seat 15 to cut down or stop flow through the orifice 14 until the pressure in chamber 48 falls sufficiently to enable spring 28 to move connecting member 23 downwardly to again cause the valve to open. Washer 25 may limit the amount of opening of valve 16 by its engagement with hub 2, and it will of course be understood that sufficient working range of movement is thus provided. Within the limits thus provided, the response of the regulator may be varied by adjustment of the plug 43 to vary the position of shoe 38 in closed position of the valve and thus vary the ratio of movement of valve member 16 to movement of diaphragm 21. Spring 19 is strong enough to insure that the valve member 16 follows the movement of the toggle rods 36 and 41.

In the modification shown in Figure 2, wherein like parts are correspondingly numbered, the body 60 has a somewhat different form and has an outlet connection 61 in its bottom and a spring cover 62 of somewhat different shape than cover 22 clamps diaphragm 21 to the body. The body has a central recess 63 corresponding to outlet chamber 48 of Figure 1, and a central guide member 64 is located in the hub 2 and provides a clearance space 65 with the bore 3. Plate 67 is recessed at 68 to receive the upper end of guide member 64, and the diaphragm 21 is clamped between plates 66 and 67 by the spring 28. A rod 69 extends through a bore 70 in the guide member 64 and between the bifurcations 71 of the hub 2 to prevent turning of the guide member. The central guide member 64 has a bore 73 therein in which is fitted a hexagonal shoe 74 with a close sliding fit, this shoe having generally tapered recesses 76 and 77 in the opposite ends thereof. Toggle rod 36 has one end engaging the valve 16 and the other end engages in recess 76 of the shoe 74, and one of the toggle rods 41 engages the recess 77 in the shoe 74 and the other end engages the abutment member 38. The position of abutment member 38 is determined by an adjustment plug 78 threaded in the bore 7 and having an extension 79 engaging the shoulder 81 of the abutment member 38. This construction prevents contact of the seat insert 17 with the plug 78 and thus preserves the seat against being crushed. The end of bore 7 is closed by a pipe plug 82 or by any other suitable means.

A bushing 83 having an orifice 84 therein is located in the outlet connection 61 of the regulator, and this bushing provides one abutment for a light spring 85, the other end of the spring bearing in a suitable recess 86 at the bottom of the guide member 64. The spring 85 serves to substantially counterbalance the weight of the parts carried by the guide member.

The adjustment for the spring 28 for biasing the regulator comprises a threaded stem 87 having a collar 88 thereon abutting the shoulder 89 of the cover 62 and having an extension 91 to which is secured any suitable type of handle 92. An abutment nut 93 moving in suitable guides in the cover is threaded to the stem 87 and upon turning the handle 92 the nut 93 is moved inwardly or outwardly to adjust the compression of spring 28 to suitably bias the diaphragm 21.

In the modification shown in Figures 3 to 5 I employ a balancing diaphragm which serves to separate the outlet pressure from the control pressure of the pilot regulator. In this modification the control diaphragm 95 is clamped at its outer periphery between the body 96 and a bottom cover 97, and at its center control diaphragm 95 is clamped by nut 98 between plates 99 and 100 to the bottom portion of central guide member 101. The guide member 101 has a clearance 102 with the central hub 2 as previously described in connection with Figure 2, and at its top is connected to the center of diaphragm 21 as previously described. The outer periphery of diaphragm 21 is held to the body 96 by a modified spring cover 103 secured thereto by bolts 104 (Figure 5) and double springs 105 and 106 may be provided therein to bias the diaphragms. These springs may be adjusted by a threaded stem 87 having a suitable nut 107 thereon similar to nut 93, the outer end of the stem having a non-circular portion 108 adapted to receive a handle or wrench. A cap 109 threaded into a recess 110 normally encloses the end of the stem.

The toggle arrangement for operating the valve 16 is like that described in connection with Figure 2 except as hereinafter noted. An abutment thimble 111 is threaded into the bore 7 and has a recess 112 with a piston 113 therein which is urged in one direction by spring 114, a pin 114' extending into a slot 115 in the piston serving to limit movement thereof and spring 114 is under initial bias urging piston 113 against the pin. The piston 113 has a tapered recess 115' which receives one end of toggle rod 41. The thimble 111 is locked in position by a locking plug 116 and the end of bore 7 is closed by pipe plug 82. The purpose of this construction is to provide a yieldable abutment 113 so that when the valve 16 is closed any further movement of the central guide member 101 will not crush the valve insert 17. It also will be observed that the toggle rods 36 and 41 in this modification are pointed at their ends thus providing a bearing surface of reduced area that reduces friction. A spring 117 may be interposed below plate 100 to substantially counterbalance the weight of connecting member 101 and the parts carried thereby.

In this modification there is provided a loading pressure chamber 120 between diaphragms 21 and 95, and a control chamber 121 on the under side of the diaphragm 95. By referring to Figure 4 it will be seen that there is provided a passageway 122 connected at one end with loading chamber 120 and passing through the clamped periphery of diaphragm 95 and through the bottom cover 97 to connect with a horizontal bore 123 located in a boss 118 on the cover which connects with the loading outlet 124. Bore 123 may be closed at its end by a plug 125. The fluid pressure in chamber 120 thus is conducted to loading outlet connection 124 whereby it is conducted to the apparatus to be loaded thereby. A bushing 126 having a bleed orifice 127 therein is provided to allow escape of fluid from loading outlet 124 into control chamber 121 and from thence by control connection 129 (Figure 3) to any suitable point of discharge. Control connection 129 located in a boss 128 on the cover offset from boss 118 is connected to the pressure to be controlled.

The operation of the modification shown in Figures 3 to 5 now will be described. High pressure fluid enters through the valve orifice 14 when the valve is open into the loading chamber 120, where it becomes the loading pressure, and thence the fluid flows through bore 122 (Figure 4) and passage 123 into the loading outlet connection 124. From there the fluid slowly escapes through bleed orifice 127 into the control chamber 121 and flows from the control chamber through passage 129 (Figure 3) back to the low pressure side of the line or to any other source of control pressure. By reason of the small size of orifice 127 and large size of control connection 129 the amount of high pressure fluid flowing from loading outlet 124 therethrough into control chamber 120 produces substantially no effect or change in pressure in the control chamber 121. The pressure in control chamber 121, therefore, is determined by the pressure at the control point to which connection 129 is made. It will be noted that the loading pressure in chamber 120 is exerted in opposite directions on diaphragms 21 and 95 and by selecting these diaphragms to have equal exposed areas the effect of any variations in loading pressure is balanced out and the assembly comprising diaphragms 21 and 95 become responsive solely to the control pressure in chamber 121. This action may be explained as follows.

The bias of springs 105 and 106 tends to force guide member 101 downward and thus open valve 16. However, assuming no pressure in chamber 120, valve 16 would be closed when the combined action of spring 117 and the pressure in control chamber 121 is sufficient to just overbalance the force of springs 105 and 106. If now it is assumed that fluid under pressure is introduced through valve 14 into chamber 120, the force of this fluid exerted upwardly against the diaphragm 21 is exactly equal to the force of this fluid exerted downwardly against the diaphragm 95 so that the valve 16 still remains solely responsive to changes in pressure in the control chamber 121, and changes in pressure in chamber 120 will in no way influence the action of valve 16 to cause it to open or close.

If desired, the regulator shown in Figures 3 to 5 may be modified as shown in Figure 6, the bleed orifice bushing 127 being replaced by a solid plug 130, plug 125 being removed and a bleed orifice bushing 131 having an orifice 132 being inserted in bore 123 whereby the loading pressure bleeds to atmosphere.

In Figure 7 I have illustrated how the regulator shown in Figures 3, 5 and 6 may be converted into a back pressure regulator. This is accomplished by disassembling the regulator, inverting guide member 101 and re-assembling the regulator. In this modification it will be seen that because of the inverted position of toggle rods 36 and 41 when the guide member 101 is in its uppermost position, the valve 16 is open and when the guide member 101 is in its lowermost position the valve 16 is closed. The control chamber 121 is connected by aligned bores 135 and 136 to the well 8 at the high pressure side having the strainer 9 therein so that the chamber 121 is controlled by the pressure on the high pressure side of the regulator. The end of connection 129 is plugged by a plug 137, and a solid plug 130 is provided to separate chamber 121 from loading connection 124, as shown in Figure 6.

This modification operates as follows. Fluid from the high pressure side enters the chamber 121 through aligned passages 135 and 136 to exert a controlling force on the diaphragm 95. When the pressure in chamber 121 counterbalances the effect of the springs 105 and 106 the diaphragm 95 is forced upwardly and with it the guide member 101, thus moving the toggles 36 and 41 away from aligned position and opening valve 16 to admit high pressure fluid into the chamber 120. Fluid flows from chamber 120 by passage 122 (Figure 6) passage 123 and loading connection 124 to the regulator to be loaded, and the loading pressure bleeds through orifice 132 (Figure 6) to atmosphere or back to the low pressure line through a suitable conduit adapted to be connected at the end of bore 123.

In Figure 8 I have shown a system employing my improved pilot regulator in conjunction with a main regulator in which the valves open by downward movement. This system comprises a high pressure main 140, a low pressure main 141 and a valve bowl 142 interposed therebetween. This valve is diagrammatically shown and may be of any suitable construction and preferably is of the balanced type opening upon downward movement of the valves. A stem 143 suitably connected to the valve members 144 is connected at its upper end to the diaphragm 145 secured in a case 146 and providing pressure chambers 147 and 148 on opposite sides thereof, and if desired a stuffing box may be used to reduce or prevent leakage of gas around the stem. A spring 149 may be employed to provide a suitable bias on the valves 144 so as to substantially overbalance the weight of the valves 144 and parts connected therewith to maintain the valves in normally closed position. The pilot regulator is shown in elevation at 150 and is constructed as hereinbefore described, for example, in Figures 3, 4 and 5. The pilot regulator 150 has its inlet 11 connected by a conduit 152 to the high pressure main 140 and the loading outlet pipe 124 of the pilot regulator is connected to the chamber 147 of the main regulator case. The control outlet 129 (Figure 3) is connected by conduit 153 to the low pressure main 141, and the end of passage 123 is closed by a plug 125. A conduit 154 is also connected between the conduit 153 and the chamber 148 of the main regulator, and may have a suitable restriction therein, if desired. The pressure in main 141 is transmitted through conduit 153 and conduit 154 to chamber 148, and by conduit 153 and passage 129 (Figure 3) to the control chamber 121. The double acting safety valve 155 connected to chambers 147 and 148 is of known construction and maintains a predetermined maximum difference in pressures in chambers 147 and 148 should a sudden surge of pressure occur in either chamber above a predetermined differential.

In this modification the pressure in main 141 is to be controlled by the valves 144 connected to the diaphragm 145, and pilot regulator 150 maintains a predetermined loading pressure in chamber 147. The diaphragm 145 responds to the difference in pressure in chambers 147 and 148 to control the position of valves 144. Control chamber 121 of the pilot regulator is connected to main 141 and when the pressure in main 141 falls below a predetermined value it permits diaphragm 95 of the pilot regulator and connecting member 101 to move downwardly and thus open valve 16 and allow a greater loading pressure to build up in loading or balancing chamber 120. This loading pressure is conducted by passage 122 (Figure 4) bore 123 and loading connection 124 to the chamber 147 above the diaphragm 145 and causes the valve 144 to open to allow an increased flow therethrough to re-establish the desired predetermined pressure in main 141. The loading pressure slowly bleeds from chamber 147 through connection 124 (Figure 4) and bleed orifice 127 into control chamber 121 and thence by passage 129 and conduit 153 (Figure 8) to the low pressure line 141. However, the small orifice 127 and relatively large passage 129 prevents any appreciable change in pressure in chamber 121 due to this bleed.

When the pressure in main 141 rises too high, the pressure is conducted to control chamber 121 (Figure 3) and causes valve 16 to close and remain closed until the fluid escaping through bleed orifice 127 allows the pressure in chamber 147 to fall until spring 149 and the pressure in chamber 148 close valves 144 or reduce the flow therethrough sufficiently to lower the pressure in main 144 to the desired value. This modification operates substantially like the modification shown in Figures 1 to 5 of my said pending application.

It will be observed, with particular reference to Figures 8 and 3, that if diaphragm 95 has a greater area than diaphragm 21, the outlet pressure in main 141 will be increased or boosted with increased rate of flow. This is explained by the fact that the loading pressure in chamber 120 exerted on diaphragm 95 is not balanced out completely but part becomes additive to the loading and therefore requires a higher control pressure to close the valve 16. This higher control pressure is supplied when the pressure in main 141 builds up. Accordingly, I wish it to be understood that my invention is not limited to diaphragms of equal area unless expressly so stated in the claims.

If it is desired to bleed the loading pressure to atmosphere, the regulator 150 of Figure 8 is modified with the bleed orifice arrangement of Figure 6. In this modification the spring 149 may be omitted, if desired.

In Figure 9 I have shown a back pressure pilot regulator for controlling the main regulator. The back pressure regulator 150 may be constructed as illustrated in Figure 7 with the bleed arrangement of Figures 3, 5 and 6, passage 129 being closed by plug 137. Control chamber 121 in this modification is connected by the passages 135, 136 to the high pressure source entering by conduit 152 and the regulator thus is controlled by the back pressure in main 140. Loading chamber 120 connects by passages 122 and 123 and connection 124 to the chamber 147 above diaphragm 145, and the pressure bleeds through orifice 132 and conduits 157 and 153, to the low pressure main 141.

In Figure 7a I have shown an intermittent bleed attachment which may be applied to any of the modifications shown in Figures 1, 2 or 3, or to a back pressure modification illustrated in Figures 6 and 7.

In applying this attachment, for example, to the modification shown in Figure 3, the plug 82, bushing 116, thimble 111, piston 113 and spring 114 are removed and replaced by the assembly shown in Figure 7a. This assembly comprises a bushing 160 having a threaded end adapted to be received in the threaded bore 7 of the body 1, a felt washer 162 being provided as a closure. Bushing 160 is bored at 163 to receive a non-circular rod 164 which is enlarged at its inner end to provide an abutment 165 against which toggle link 41 abuts. Bore 163 is machined to provide a valve seat 166 and the opposite end of rod 164 carries a valve member comprising a cap 167 having an insert 168 adapted to engage valve seat 166. A screw 169 holds the valve member in position. A washer 161 is provided to prevent leakage and by selection of the thickness of this washer the seating of valve 167 may be adjusted. Plug 171 threaded in the bore 172 of the bushing 160 has an orifice 173 therethrough and a boss 174 serves as a center for a spring 175 which engages valve member 167. A plug 176 having a hole 177 therein may be provided to prevent accidental displacement of plug 171.

In operation the spring 175 is made strong enough so that it will keep valve 167 closed and retain abutment 165 in position so that the regulator may control valve 16 in the usual manner. However, should the control pressure rise too high it will raise the diaphragm assembly causing the toggle links to tend to straighten and first close valve 16, then upon further increase in control pressure it will unseat valve 167, thus bleeding the loading pressure to the atmosphere until the control pressure falls low enough to enable valve 167 to close again. This modification is of particular utility in connection with a motor valve, the loading chamber 120 being connected to the diaphragm head of the motor valve. By a motor valve, I mean a structure such as the main regulator shown in Figures 8 and 9 in which chamber 148 is vented to atmosphere and pipe connection 154 is omitted.

What I claim and desire to secure by Letters Patent of the United States is:

1. A fluid pressure regulator comprising a body, a diaphragm secured at its peripery to the body and providing a fluid pressure chamber on one side thereof, an inlet and outlet for said chamber, a valve for controlling said inlet, a plurality of toggle links normally positioned off center connecting said valve and diaphragm, a second diaphragm connected to said first diaphragm and closing said chamber, and a cover for said second diaphragm forming a control chamber therewith and having a control connection.

2. A fluid pressure regulator comprising a body, a diaphragm secured at its periphery to the body and providing a fluid pressure responsive chamber on one side thereof, an inlet and outlet for said chamber, a valve for controlling said inlet, an extension member connected to said diaphragm, means to guide said extension member, a second diaphragm secured at its center to said extension member and at its periphery to said body and forming a wall of said pressure responsive chamber, the effective areas of said diaphragm being substantially equal, a toggle link between said extension member and valve in the space between said diaphragms, a second toggle link abutting said first toggle link at one end and engaging an abutment at its opposite end, means for biasing said toggle links to off center position, and a cover for said second diaphragm forming a control chamber therewith and having a control connection.

3. A fluid pressure regulator comprising a body open at its ends, a pair of diaphragms connected together for conjoint movement and closing the ends of said body to form a fluid pressure chamber therebetween, a cover for one of said diaphragms forming a control chamber therewith, a control connection for said control chamber, an inlet connection for said fluid pressure chamber, valve means operated by said diaphragms for controlling said inlet connection, and a bleed connection between said fluid pressure chamber and control chamber.

4. A fluid pressure regulator comprising a body open at its ends, a pair of diaphragms connected together and closing the ends of said body to form a fluid pressure chamber therebetween, a cover for one of said diaphragms forming a control chamber therewith, a control connection for said control chamber, an inlet connection for said fluid pressure chamber, valve means for controlling said inlet connection, a plurality of toggle links connecting said valve means and diaphragms, a bleed connection between said fluid pressure chamber and control chamber.

5. A fluid pressure regulator comprising a body open at its ends, a pair of diaphragms connected together and closing the ends of said body to form a fluid pressure responsive chamber therebetween, a pair of tubular spokes extending into said chamber from the body to provide a hub, an extension member connected to said diaphragms, and guided in said hub, an inlet in one of said spokes of said chamber, a valve movable in one of said spokes for controlling said inlet, a toggle link connecting said valve and extension member, and a cover for one of said diaphragms forming a control chamber therewith and having a control connection.

6. A fluid pressure regulator comprising a body open at its ends, a pair of diaphragms connected together and closing the ends of said body to form a fluid pressure responsive chamber therebetween, an internal hollow hub having hollow spokes radiating therefrom, an inlet for said chamber in one of said spokes, a valve movable in one of said spokes and guided therein for controlling said inlet, an extension member guided in said hub connected to said diaphragms, a transversely slidable shoe in said extension member, a toggle link connecting said shoe and valve, an abutment in the other of said spokes, a toggle link connecting said shoe and abutment, and a cover for one of said diaphragms forming a control chamber therewith and having a control connection.

7. A fluid pressure regulator comprising a main regulator valve and a diaphragm connected thereto forming fluid pressure responsive chambers on opposite sides thereof, means connecting one of said fluid pressure responsive chambers to the pressure source to be controlled, means for supplying flow of fluid under pressure to the other of said fluid pressure responsive chambers, said latter means including a valve, a pair of diaphragms connected to said latter valve and providing a loading chamber therebetween and a control chamber on one side thereof, a conduit connecting said loading chamber to said other fluid pressure responsive chamber, a conduit connected from said second mentioned means to said control chamber, and means to bleed fluid from the loading chamber.

8. A fluid pressure regulator comprising a main regulator valve and a diaphragm connected thereto forming fluid pressure responsive chambers on opposite sides thereof, means connecting one of said fluid pressure responsive chambers to the pressure source to be controlled, means for supplying a flow of fluid under pressure to the other of said fluid pressure responsive chambers, said latter means including a valve, a pair of diaphragms connected to said latter valve and providing a loading chamber therebetween and a control chamber on one side thereof, a conduit connecting said loading chamber to said other fluid pressure responsive chamber, and a conduit from said pressure source to be controlled, to said control chamber, and means intermittently operated to bleed fluid from the loading chamber.

9. A fluid pressure regulator comprising a body, a diaphragm secured to the body at its periphery and providing a fluid responsive chamber on one side thereof, said fluid responsive chamber having an inlet and an outlet, a second diaphragm connected to the first diaphragm and subject on one side to the pressure in said chamber, a spacer secured to said diaphragms having a transverse bore therein, a valve for controlling said inlet, means connecting said valve with said diaphragms comprising a plurality of toggle links extending into said bore in abutting relation and normally positioned off center, and means for adjusting the pivot position of one of the toggle links.

FREDERICK H. KINDL.